(12) United States Patent
Seigler et al.

(10) Patent No.: US 6,807,032 B1
(45) Date of Patent: Oct. 19, 2004

(54) MAGNETIC READ HEAD WHEREIN THE SHIELDS ARE USED AS ELECTRICAL LEADS AND HAVE A MINIMIZED ANISOTROPIC MAGNETO-RESISTANCE EFFECT

(75) Inventors: Michael Allen Seigler, Pittsburgh, PA (US); Isabel Goncalves Trindade, Pittsburgh, PA (US); Petrus Antonius Van der Heijden, Pittsburgh, PA (US); Michael Kevin Minor, Gibsonia, PA (US); Mark William Covington, Pittsburgh, PA (US); Rene' Johannes Marinus van de Veerdonk, Pittsburgh, PA (US); Sharat Batra, Wexford, PA (US); Robert Earl Rottmayer, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 267 days.

(21) Appl. No.: 09/776,435

(22) Filed: Feb. 2, 2001

Related U.S. Application Data

(60) Provisional application No. 60/180,298, filed on Feb. 4, 2000.

(51) Int. Cl.[7] .............................................. G11B 5/127
(52) U.S. Cl. ...................................................... 360/319
(58) Field of Search ................................ 360/319, 320, 360/322, 324.2, 135, 244, 121, 313

(56) References Cited

U.S. PATENT DOCUMENTS

| | | |
|---|---|---|
| 3,881,190 A | 4/1975 | Brock et al. |
| 3,940,797 A | 2/1976 | Brock et al. |
| 5,247,413 A | 9/1993 | Shibata et al. |
| 5,323,285 A | 6/1994 | Smith |
| 5,446,613 A | 8/1995 | Rottmayer |
| 5,576,914 A | 11/1996 | Rottmayer et al. |
| 5,596,463 A * | 1/1997 | Hashimoto .................. 360/121 |
| 5,668,688 A | 9/1997 | Dykes et al. |
| 5,691,862 A * | 11/1997 | Hashimoto .................. 360/244 |
| 5,731,937 A | 3/1998 | Yuan |
| 5,784,224 A | 7/1998 | Rottmayer et al. |
| 5,847,907 A * | 12/1998 | Hashimoto .................. 360/135 |
| 5,959,811 A | 9/1999 | Richardson |
| 6,061,210 A * | 5/2000 | Gill |
| 6,097,578 A * | 8/2000 | Pokhil ........................ 360/319 |
| 6,118,624 A * | 9/2000 | Fukuzawa et al. ..... 360/324.12 |
| 6,134,089 A | 10/2000 | Barr et al. |
| 6,169,646 B1 * | 1/2001 | Macken et al. ............. 360/319 |
| 6,195,229 B1 * | 2/2001 | Shen et al. .................. 360/119 |
| 6,198,609 B1 * | 3/2001 | Barr et al. ................... 360/322 |
| 6,219,205 B1 | 4/2001 | Yuan et al. |
| 6,222,702 B1 * | 4/2001 | Macken et al. ............. 360/128 |
| 6,233,125 B1 | 5/2001 | Knapp et al. |
| 6,239,954 B1 * | 5/2001 | Segar et al. ................. 360/313 |
| 6,249,407 B1 | 6/2001 | Aoshima et al. |
| 6,342,993 B1 * | 1/2002 | Sato ........................... 360/319 |
| 6,411,477 B1 * | 6/2002 | Gill ........................ 360/324.12 |
| 6,459,551 B1 * | 10/2002 | Hayakawa .................. 360/313 |
| 6,515,824 B1 * | 2/2003 | Sato ........................... 360/126 |

* cited by examiner

*Primary Examiner*—Allen Cao
(74) *Attorney, Agent, or Firm*—Benjamin T. Queen, II, Esq.; Pietragallo, Bosick & Gordon

(57) ABSTRACT

A ferromagnetic shield material having a minimized anisotropic magneto-resistance effect permits the use of a combined shield/electrical lead for magneto-resistive read elements. The shields/electrical leads may therefore be placed closer together, maximizing the recording density that may be read by a magnetic recording head using a read element having such shields/leads.

14 Claims, 10 Drawing Sheets

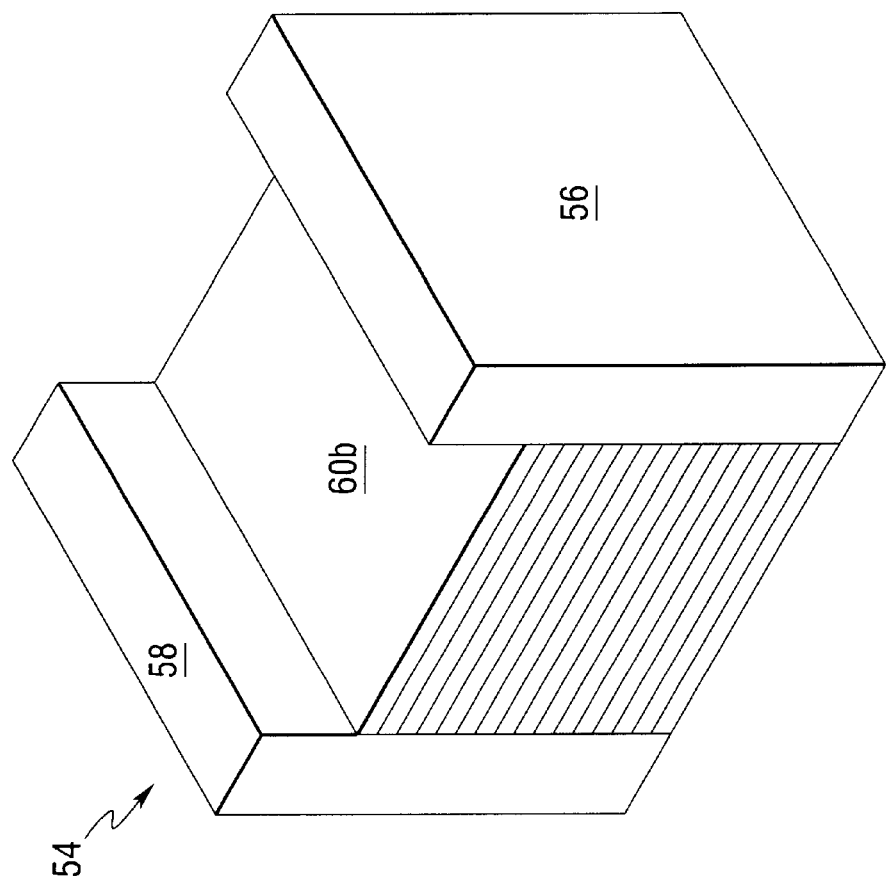
FIG. 4 *PRIOR ART*
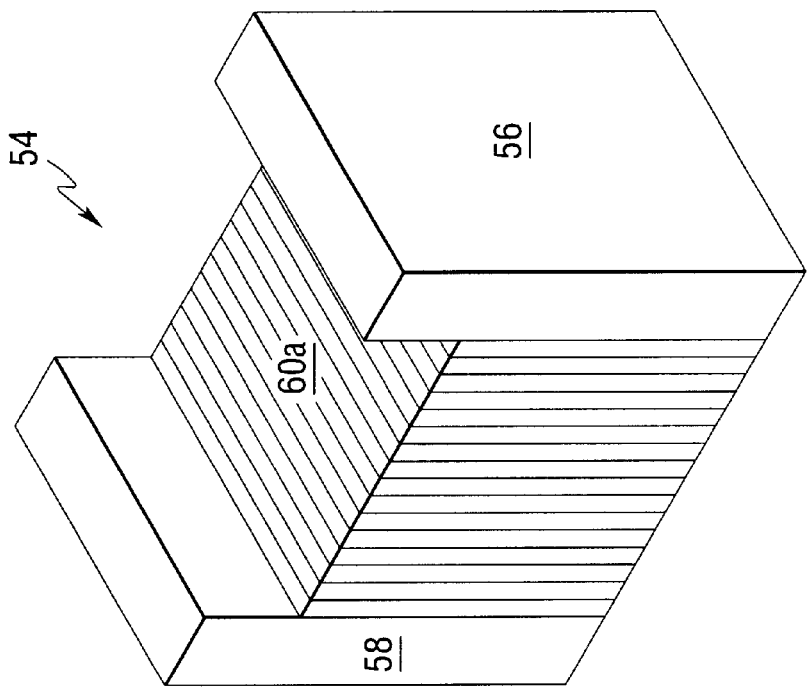
FIG. 3 *PRIOR ART*

MAGNETIC READ HEAD WHEREIN THE SHIELDS ARE USED AS ELECTRICAL LEADS AND HAVE A MINIMIZED ANISOTROPIC MAGNETO-RESISTANCE EFFECT

CROSS REFERENCE TO RELATED APPLICATION

This application claims the benefit of U.S. Provisional Patent Application No. 60/180,298, filed Feb. 4, 2000.

BACKGROUND OF THE INVENTION

1. Field of the Invention

The present invention relates to read elements for recording heads for use with magnetic recording media. Specifically, the invention relates to a combined shield/electrical lead for the read element having minimized Anisotropic Magneto-Resistance (AMR) effect.

2. Description of the Related Art

Magneto-resistive (MR) and giant magneto-resistive (GMR) read elements for reading from magnetic recording media have been proposed to overcome the limited sensitivity of inductive reading GMR read elements are generally composed of alternating layers of magnetic and nonmagnetic material, so that, when exposed to a magnetic field, the relative change in the orientation of the magnetizations in the magnetic layers alters the spin dependent scattering of conduction electrons, thereby increasing or decreasing the resistance of the GMR head to an applied sense current. A constant resistance level indicates a binary "0," and a changing resistance level indicates a binary "1."

Spin valves have also been used to increase the read sensitivity of recording heads. A typical spin valve comprises a pair of ferromagnetic layers having a nonmagnetic layer therebetween, with an antiferromagnetic layer adjacent to one of the ferromagnetic layers. The antiferromagnetic layer is a material that is generally not affected by external magnetic fields, and is therefore generally considered to be nonmagnetic. However, the material has been annealed at high temperature and cooled while exposed to a magnetic field. The magnetization in the ferromagnetic layer closest to the antiferromagnetic layer will align itself with respect to the orientation of the closest layer of the antiferromagnetic material. The combination of the ferromagnetic layer and adjacent antiferromagnetic layer is commonly known as the pinned layer, with the opposite ferromagnetic layer known as the free layer. When the spin valve is exposed to a magnetic field, the orientation of the magnetiationof the free layer will change to correspond with this magnetic field. This relative change in the orientation of the magnetization of the free layer will alter the spin dependent scattering of conduction electrons, thereby increasing or decreasing the resistance of the spin valve to an applied sense current. As before, a constant resistance level indicates a binary "0" and the changing resistance level indicates a binary "1."

Read elements are located between a pair of ferromagnetic shields for preventing the read element from being influenced by magnetic domains adjacent to the domain currently being read. The sense current for detecting changes in the resistance of the read element is applied through a pair of leads on opposing sides of the read element. This sense current may be applied either parallel to the plane of the alternating layers within the read element (CIP), or perpendicular to the plane of these alternating layers (CPP). To minimize the resistance of the electrical leads, these leads must be thick. Additionally, a typical ferromagnetic shield will exhibit an Anisotropic Magneto-Resistance (AMR) effect, wherein the resistance of the shield will change if its magnetization direction changes. Therefore, a thick insulation must be provided between the electrical leads for the read element and the ferromagnetic shields to prevent any sense current from flowing through the shields, thereby causing both changes in the resistance of the read element and changes in the resistance of the shields to be detected. The resulting sequence of thick layers increases the distance from one shield to the other, thereby reducing the maximum linear bit density within the corresponding magnetic recording media.

Accordingly, there is a need for a magnetic recording head having reduced distance between the magnetic shields for its read elements. Additionally, there is a need for a magnetic shield material having a minimized AMR effect.

SUMMARY OF THE INVENTION

The present invention is an improved recording head for use with magnetic recording media. The improved recording head includes a read element having a pair of shields for which the anisotropic magneto-resistance effect has been minimized, thereby permitting the shields to serve the additional purpose of electrical leads for the read element.

A preferred embodiment of the present invention includes a recording head combining a read portion and a write portion. The write portion may be of either perpendicular or longitudinal configuration. A typical perpendicular recording head includes a main pole, an opposing pole magnetically coupled to the main pole, and an electrically conductive coil adjacent to the main pole. The bottom of the opposing pole will typically have a surface area greatly exceeding the surface area of the main pole's tip. Likewise, a typical longitudinal recording head includes a pair of poles, with a coil adjacent to one pole. Unlike a perpendicular recording head, a longitudinal recording head will typically use poles having bottom surfaces with substantially equal areas. In either case, electrical current flowing through the coil creates a flux through the main pole. The direction of the flux may be reversed by reversing the direction of current flow through the coil.

In some preferred embodiments, the opposing pole of the perpendicular head (or the first pole of the longitudinal head) can also form one of two substantially identical shields for the read elements, which are parallel to the trackwidth The read element is located between these shields. The shields also form electrical leads for the read elements, thereby eliminating the necessity of a separate electrical lead, and insulation between the electrical lead and the magnetic shield.

Presently available magnetic shields are generally combinations of Ni, Fe, and Co. Such magnetic shields have too much variation in resistance with changing magnetization direction within the material. This is known as the Anisotropic Magneto-Resistance (AMR) effect. A sense current passing through these combination lead/shields and the read element would measure the change in resistance not only in the read elements, but also within the lead/shields. Therefore, a lead/shield of the present invention includes additional elements that will reduce the AMR effect. Examples of additional materials include Cu, Cr, Mn, Ti, Au, Ag, V, Zr, Nb, Ta, and W. Preferred embodiments of lead/shields of the present invention include both alloys of these elements within the crystal structure of the magnetic shields material, and laminated structures wherein these elements are layered within the magnetic shields. Another preferred embodiment may include a separate, low resistivity lead outside the lead/shields, on opposing sides of the read element and associated shields. The low resistance of these leads will cause current to travel through these leads instead of through the magnetic shields for the maximum distance possible, traveling through the shields for the smallest distance possible. This will result in current flowing through the magnetic shields perpendicular to the surface of the read element, thereby yielding constant shield resistance.

Although the present invention may be used with any presently known read elements, it is particularly useful with low resistance read elements such as giant magneto-resistive (GMR) elements and spin valves. The invention may still be used with high resistance read elements such as tunnel magneto-resistive (TMR) read elements.

GMR read elements are generally composed of alternating layers of magnetic and nonmagnetic material, so that, when exposed to a magnetic field, the relative change in the orientation of the magnetizations in the magnetic layers alters the spin dependent scattering of conduction electrons, thereby increasing or decreasing the resistance of the GMR head to an applied sense current. A constant resistance level generally indicates a binary "0," and a changing resistance level generally indicates a binary "1."

A typical spin valve comprises a pair of ferromagnetic layers having a nonmagnetic layer therebetween, with an antiferromagnetic layer adjacent to one of the ferromagnetic layers. The antiferromagnetic layer is a material that is generally not affected by external magnetic fields, and is therefore generally considered to be nonmagnetic. However, the material has been annealed at high temperature and cooled while exposed to a magnetic field. The magnetization in the ferromagnetic layer closest to the antiferromagnetic layer will align itself with respect to the orientation of the closest layer of the antiferromagnetic material. The combination of the ferromagnetic layer and adjacent antiferromagnetic layer is commonly known as the pinned layer, with the opposite ferromagnetic layer known as the free layer. When the spin valve is exposed to a magnetic field, the orientation of the magnetic field within the free layer will change to correspond with this magnetic field. This relative change in the orientation of the magnetizations within the free layer will alter the spin dependent scattering of conduction electrons, thereby increasing or decreasing the resistance of the spin valve to an applied sense current. As before, a constant resistance level generally indicates a binary "0" and the changing resistance level generally indicates a binary "1."

Tunnel magneto-resistive read elements include a pair of ferromagnetic layers with a nonmagnetic insulator such as alumina oxide therebetween. An antiferromagnetic layer is adjacent to one of the two ferromagnetic layers. The operation of a TMR read element is similar to that of a spin valve.

A typical magnetic recording medium includes a first layer having a plurality of magnetically permeable tracks separated by nonmagnetized transitions. If perpendicular recording is desired, the magnetic recording medium may include a magnetically permeable lower layer. The lower layer is magnetically soft relative to the tracks.

To read from the magnetic recording medium, the recording head is separated from the magnetic recording medium by the flying height. The magnetic recording medium is moved past the recording heads so that the recording head follows the tracks of the magnetic recording medium, typically with the magnetic recording medium first passing under one shield, followed by the read element, then passing under the write portion of the recording head. As the magnetic recording medium passes under the read element, the magnetic fields within the recording medium orient the adjacent magnetization within the ferromagnetic read element layers so that they are either parallel (corresponding to minimum resistance) or antiparallel (corresponding to maximum resistance), depending on the direction of the magnetic field being read from the recording medium. A sense current is passed through the GMR element by a pair of electrical contacts, thereby enabling the read element's resistance to be detected. A constant level of resistance is read as a binary "0," and a changing resistance is read as a binary "1."

Other proposed recording heads using separate electrical leads and magnetic shields for the read element require the use of thick electrical leads to provide minimum resistance for the sense current. Additionally, the high AMR effect of presently known magnetic shields requires that sense current be prevented from traveling through the magnetic shields within prior art recording heads. Isolating the sense current from the magnetic shields requires thick insulation between the electrical leads and the magnetic shields. These additional layers between the opposing magnetic shields increases the distance between the magnetic shields. The distance between adjacent magnetic domains within a track of the magnetic recording medium must be sufficiently large so that the magnetic shields on either side of the read element will prevent the read element from being influenced by magnetic fields adjacent to the magnetic fields currently being read. Therefore, a large distance between the opposing magnetic shields limits the recording density which may be used. By combining the magnetic shields and electrical leads into a single component, the present invention reduces the distance between the magnetic shields, thereby increasing the permissible recording density.

It is therefore an aspect of the present invention to provide a recording head for use with magnetic recording media wherein the shields on either side of the read element also form the electrical leads for the read element.

It is another aspect of the present invention to provide a recording head for use with magnetic recording media having a minimized distance between the shields surrounding the read element.

It is a further aspect of the present invention to provide a magnetic recording head for use with magnetic recording media having shields with a minimized AMR effect.

It is another aspect of the present invention to provide a pair of shields for use within a magnetic recording head with a first material component having ferromagnetic properties, and a second material component having electroconductive properties, and wherein the second material component reduces the AMR effect within the first material.

It is a further aspect of the present invention to provide a magnetic recording head wherein the electrical leads for the read elements are located outside the read elements' shields, thereby causing the sense current to flow through the shields perpendicular to magnetic fields within the shields.

These and other aspects of the present invention will become more apparent through the following description and drawings.

BRIEF DESCRIPTION OF THE DRAWINGS

FIG. 3 is an isometric view of the prior art CPP read element.

FIG. 4 is an isometric view of a prior art CIP read element.

Like reference numbers denote like elements throughout the drawings.

DETAILED DESCRIPTION OF THE PREFERRED EMBODIMENTS

The present invention is an improved recording head for use with magnetic recording media. The improved recording head includes shields on opposing sides of the read element that not only shield the read element from adjacent magnetic fields, but also serve as electrical leads for supplying a sense current through the read element. These leads/shields have a minimized anisotropic magneto-resistance (AMR) effect, meaning that the change in the electrical resistance of the shields with respect to magnetization direction change with respect to a current passing through the shields is minimized. A recording head is defined as a head or slider capable of performing read and/or write operations. The present invention is directed towards the read portion of a recording head.

Figure 1:
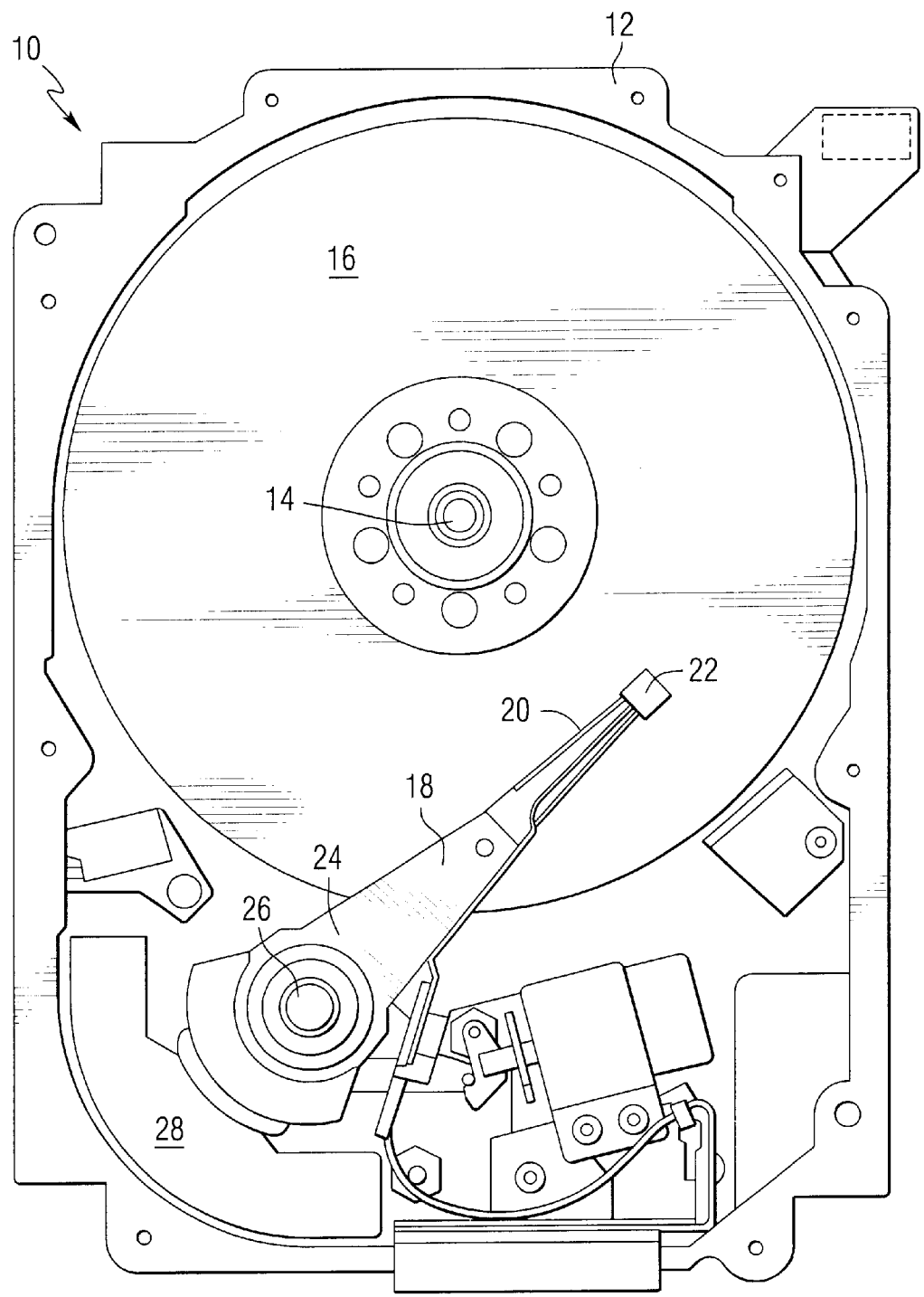
FIG. 1 is a top view of typical hard disc drive for a computer for which the present invention may be used, illustrating the disc drive with its upper housing portion removed.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc 16. The actuator motor 28 is regulated by controller which is not shown and which is well known.

Figure 2:
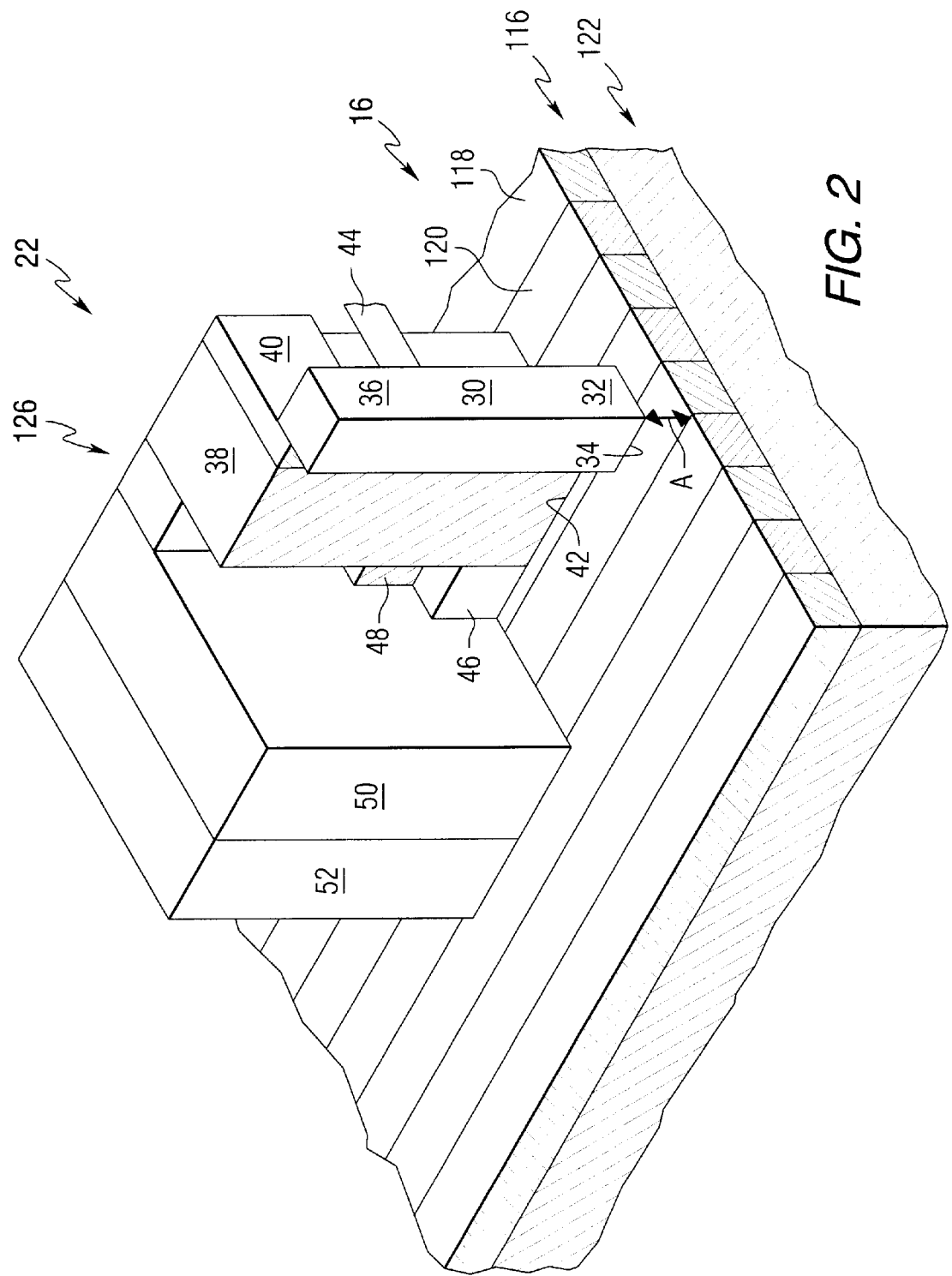
FIG. 2 is a partially sectioned, partially schematic, isometric view of a perpendicular recording head according to the present invention.

Referring to FIG. 2, a recording head 22 of the present invention is illustrated. The recording head 22 includes a magnetically permeable main pole 30, oriented substantially perpendicular to the magnetic recording medium 16, and having a tip 32. The tip 32 includes a bottom surface 34. The top 36 of the main pole 30 is magnetically coupled to an opposing pole 38, possibly through a joint 40. The opposing pole 38 includes a bottom surface 42. if perpendicular recording is desired, the bottom surface 42 will be substantially larger than the bottom surface 34. If longitudinal recording is desired, the bottom surfaces 42 and 34 may or may not have surface areas of similar size. An electrically conductive coil 44 is located adjacent to the main pole 30, and is dimensioned and configured to induce a magnetic flux in the main pole 30. The coil 44 is preferably surrounded by insulating material, as is well-known in the art.

Located adjacent to the opposing pole 38, opposite the main pole 30 and coil 44, is a read element 46. The read element 46 is preferably a giant magneto-resistive (GMR) read element, or a spin valve, but may be any other type of read element, such as a tunnel magneto-resistive (TMR) read element. If the read element 46 is a GMR read element, a permanent magnet 48 may be located above the read element 46. The read element 46 is also located between a pair of opposing magnetic shields, with one magnetic shield preferably formed by the opposing pole 38, and the other magnetic shield designated by the reference no. 50. The entire recording head 22 is preferably built up upon a substrate 52.

Referring to FIG. 2, a magnetic storage medium 16, here a magnetic disc, for use with a recording head 22 is illustrated. The disc 16 includes a recording layer 116 having a plurality of magnetically permeable tracks 118, which are divided into sectors. Each sector has several different magnetic orientations within the magnetically permeable material (not shown, but well understood). The tracks 118 are separated by nonmagnetized transitions 120. If perpendicular recording is desired, then the disc 16 also includes a magnetically permeable lower layer 122, which is magnetically soft relative to the tracks 118. In use, the disc 16 will be separated from the tip 32 of the main pole 30 by a flying height A. The flying height A is sufficiently small so that a high concentration of flux from the main pole 30 will pass through the tracks 118, but sufficiently large to prevent damage to the disc 16 from contact with the recording head 22.

Writing to the magnetic storage medium 16 is best explained referring to FIG. 2. The disc 16 is rotated relative to the recording head 22 so that the recording head 22 is located above the appropriate sectors of the track 82. As recording progresses, the disc 16 will move past the recording head 22. Current will be supplied to the coil 44, thereby inducing a magnetic field within the main pole 30. As a portion of the sector of the track 118 passes under the main pole 30, the orientation of its magnetic moment will correspond to the orientation of the magnetic moment of the main pole 30 in the case of perpendicular recording, or the orientation of the magnetic field within the write gap in the case of longitudinal recording. As the main pole passes over the disc 16, the direction of current passing through the coil 44 will remain constant when a binary "0" is being recorded, thereby creating consistent orientation of the magnetic fields within the track 118. The current passing through the coil 44 will reverse directions when a binary "1" is being recorded, thereby changing the orientation of a magnetic field within the track 118.

Reading from a magnetic recording medium 16 is also illustrated in FIG. 2. The magnetic recording medium 16 is passed under the recording head 22 so that a track 118 of the recording medium 16 passes under the read element 46. The sector of the track 118 directly under the read element 46 will be read. The magnetic fields within the track 118 directly underneath the read element 46 will be oriented either up or down if perpendicular recording is used, or forward and backward along the track if longitudinal recording is used. The sense current is applied to test the resistance of the read element 46. A constant level of resistance, regardless of whether that level of resistance is the minimum or maximum level, is interpreted as a binary "0." Similarly, a change in the level of resistance from minimum to maximum, or from maximum to minimum, is read as a binary "1."

Figure 5:
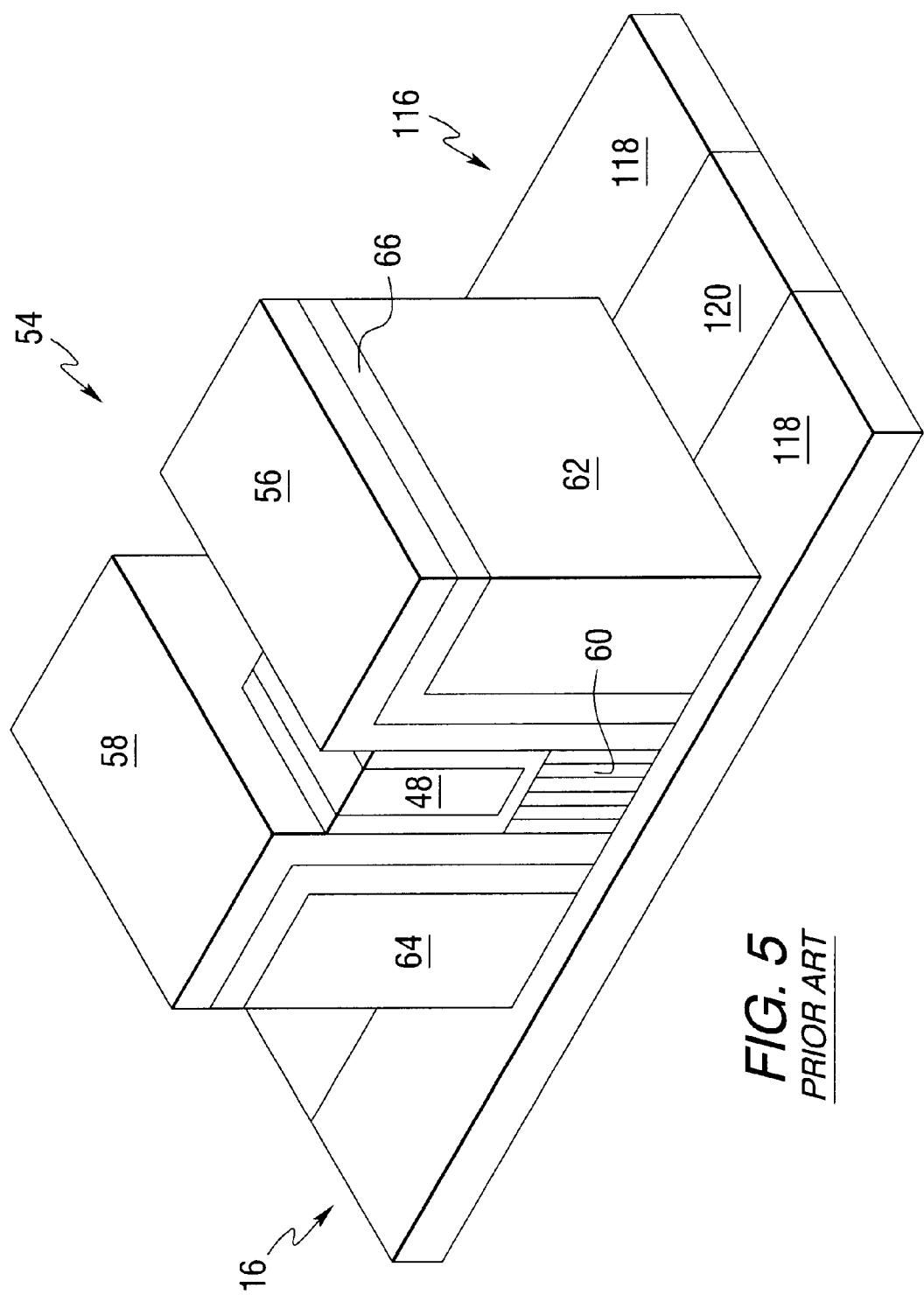
FIG. 5 is an isometric view of a prior art read element and associated electrical leads and magnetic shields.

Referring to FIGS. 3–5, a prior art read structure 54 of a recording head includes a pair of electrical leads 56, 58 on opposing sides of the read element 60. To maximize the sensitivity of the recording head 22 to changes in the resistance of the read element 60, the resistance of the leads 56, 58 must be kept to a minimum. Therefore, because resistance is inversely proportional to the cross-sectional area available to current, the leads must be relatively thick. Additionally, the sense current must be prevented from flowing through any other portion of the read head 22 which may have a resistance that changes with changing magnetization. Such changes in resistance with respect to changing magnetization is known as the Anisotropic Magneto-Resistance (AMR) effect. The shields 62, 64, located near the electrical contacts 56, 58, are known to have a relatively high Anisotropic Magneto-Resistive effect, so the sense current must be prevented from passing through these shields. Therefore, thick insulation 66 is required between the electrical leads 56, 58, and the shields 62, 64. The thick leads 56, 58, and thick insulation 66, increase the spacing between the shields 62 and 64. Therefore, the distance between adjacent domains within a magnetic recording medium 16 that can be read using the prior art recording head 54 is limited, thereby limiting the recording densities possible with a recording head 54.

Figure 6:
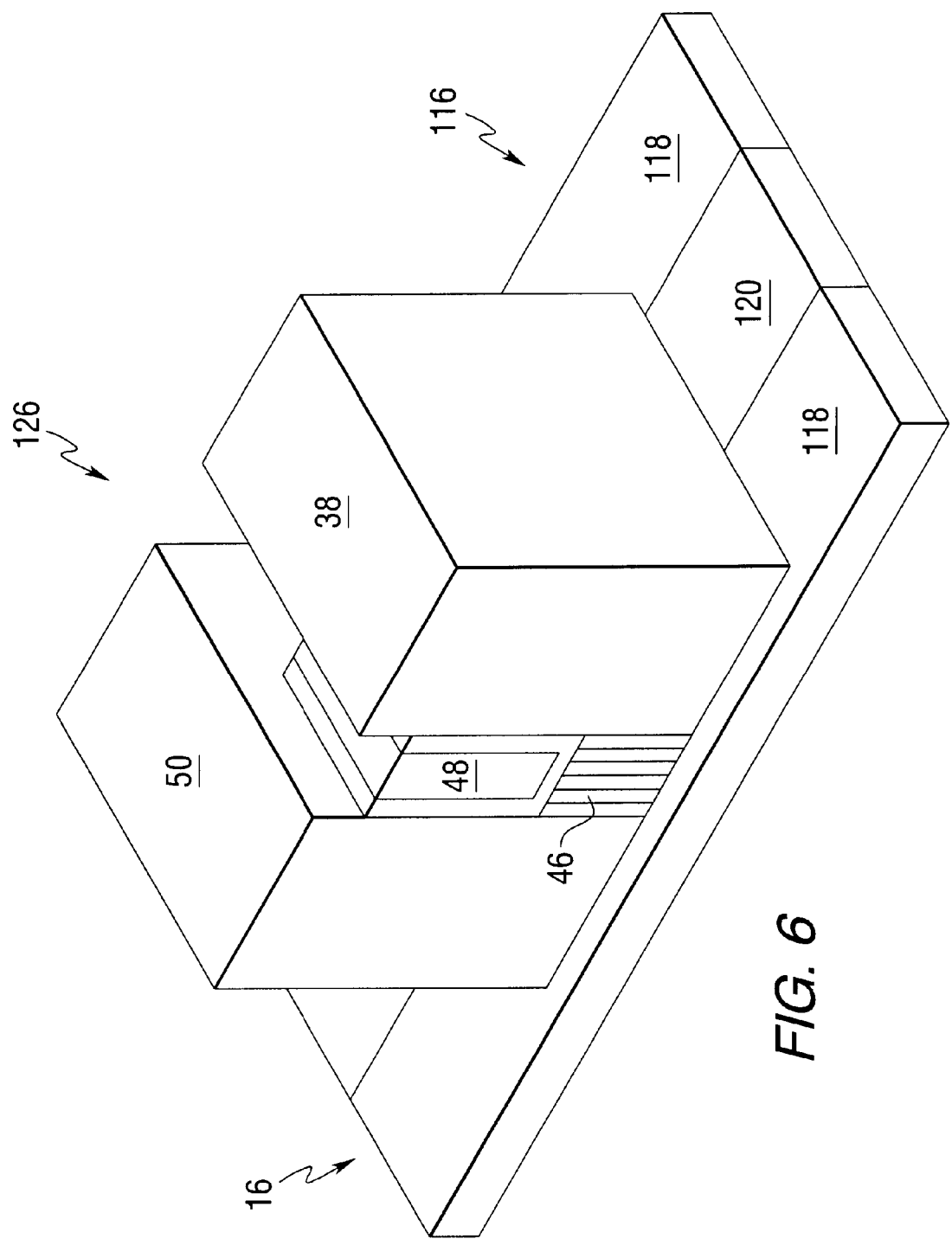
FIG. 6 is an isometric view of one embodiment of a read element and associated shields/electrical leads according to the present invention.

Referring to FIG. 6, a read structure 126 of the present invention eliminates this limitation on recording density by combining the electrical leads and shields into a single structure formed by the current shields 38, 50. Because no separate electrical leads and insulation is required, the magnetic shields 38, 50 may be placed closer together, thereby increasing the recording density with which the recording head 22 may be used. The use of the shields 38, 50 as electrical leads for the read element 46 requires that the shields 38, 50 have a minimized AMR effect, which is provided for by the present invention.

Shields such as those of reference numbers 38, 50 are typically made with magnetically permeable materials, such as nickel, iron, cobalt, or combinations thereof. One example of such a material is commonly known as permalloy, consisting of $Ni_{80}Fe_{20}$. A further example is $Ni_{90}Fe_{10}$. Another such combination is, for example, $Ni_{70}Fe_{30}$. Addition of another material that reduces the AMR effect makes the resulting material usable for a combination lead/shield. Examples of such additional material include Cu, Cr, Mn, Ti, Au, Ag, V, Zr, Nb, Ta, and W.

Figure 7:
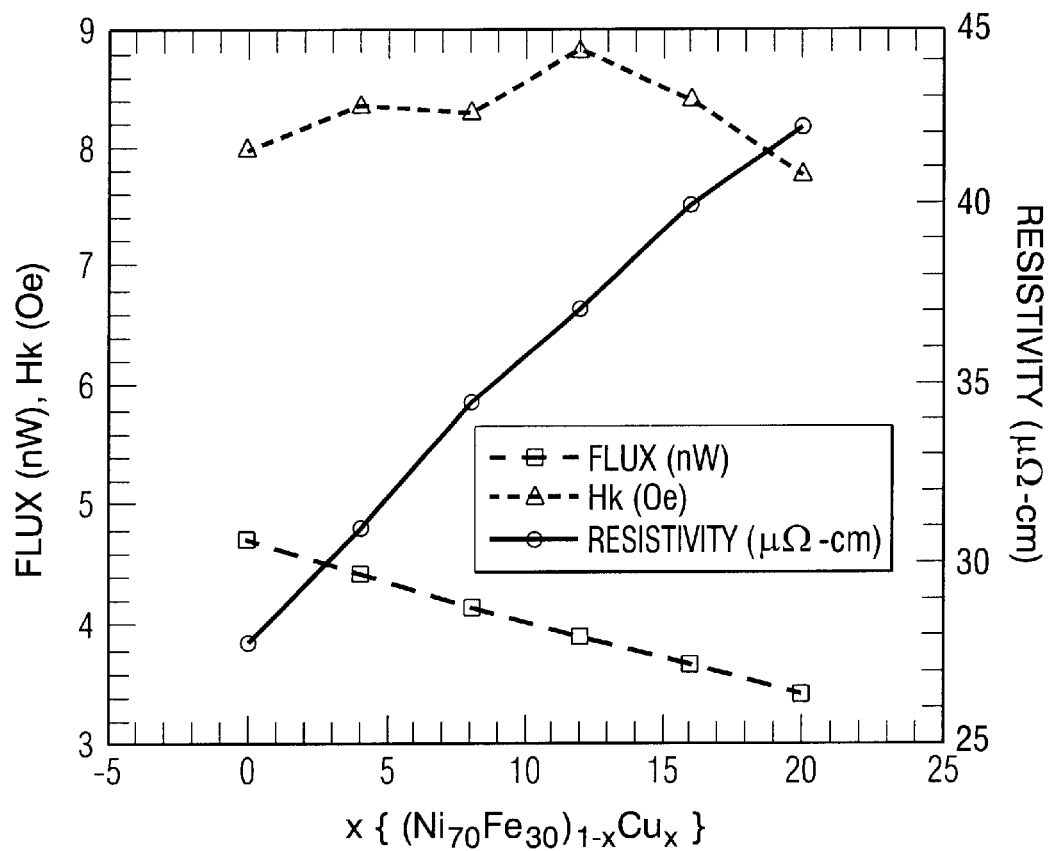
FIG. 7 is a graph illustrating the variation in flux, anisotropy field, and resistivity as a function of Cu content in the shield/lead of the embodiment of FIG. 6.
Figure 8:
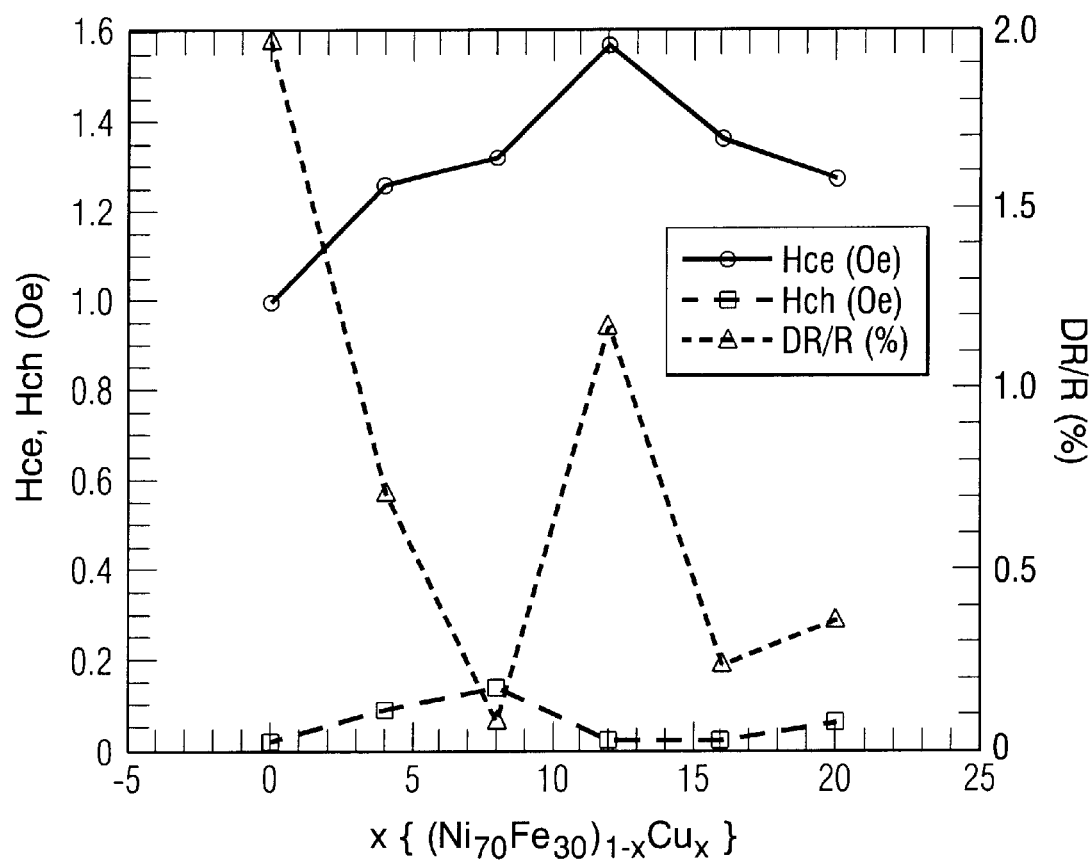
FIG. 8 is a graph showing he variation in easy access and hard access coercivities and the AMR effect as a function of Cu content in the shields/leads of the embodiment of FIG. 6.

In some embodiments, such as those of FIG. 6, the AMR-reducing material is alloyed with the magnetic shielding material. One example of such an alloy is the addition of copper to a shield material such as $Ni_{70}Fe_{30}$, the magnetic performance of which is illustrated in FIGS. 7 and 8. FIG. 7 illustrates the variation of flux, anisotropy field, and resistivity as a function of atomic percent copper in $(Ni_{70}Fe_{30})_{100-x}Cu_x$ for values of x ranging from 0 to 20. As can be seen in FIG. 7, increasing atomic percent Cu linearly decreases the flux, has little significance effect on the anisotropy field, and linearly increases resistivity. FIG. 8 illustrates the variation of easy axis coercivity, hard axis coercivity, and ΔR/R (the AMR effect) as a function of copper content in $(Ni_{70}Fe_{30})_{100-x}Cu_x$ for values of x ranging from 0 to 20.

Sensitivity of a read element is maximized by maximizing the change in resistance as a function of applied magnetic field (ΔR, or $R_{max}-R_{min}$), with respect to the total resistance (R, or $R_{min}$). Expressed differently, the quantity ΔR/R, or $(R_{max}-R_{min})/R_{min}$ (the GMR effect) should be maximized within a read element. Conversely, the present invention is directed towards minimizing this same quantity (here known as the AMR effect) within the shields 38, 50, so that only a change in resistance in the read element 46 will be sensed. Therefore, whereas a maximum ΔR/R is desirable for a read element 46, a minimum ΔR/R is desirable for a shield 38, 50 of the present invention.

Referring back to FIG. 8, it becomes apparent that ΔR/R is minimized when Cu is about 8 atomic percent, e.g. the shields 38,50 are made of $(Ni_{70}Fe_{30})_{92}Cu_8$. The same embodiment expressed differently would be $Ni_{64.4}Fe_{27.6}Cu_8$. It is well known that the atomic percentages described herein may be converted to weight percentages by first multiplying the atomic percent of each element by its atomic weight, and then dividing the resulting weight by the sum of the weight for each of the three elements. For example, the weight percent nickel in the above embodiment is calculated as (atomic percent nickel×atomic weight of nickel)/((atomic percent nickel×atomic weight nickel)+ (atomic percent iron×atomic weight iron)+(atomic percent copper×atomic weight copper))=(58.69 g/mole×0.644 mole)/((58.69 g/mole×0.644 mole)+(55.847 g/mole×0.276 mole)+(63.546 g/mole×0.08 mole))=64.8 weight percent. Similarly, this embodiment includes 26.4 weight percent iron and 8.7 weight percent copper. The resulting alloy for this example comprises a face-centered cubic crystal structure in the (1,1,1) direction.

Figure 9:
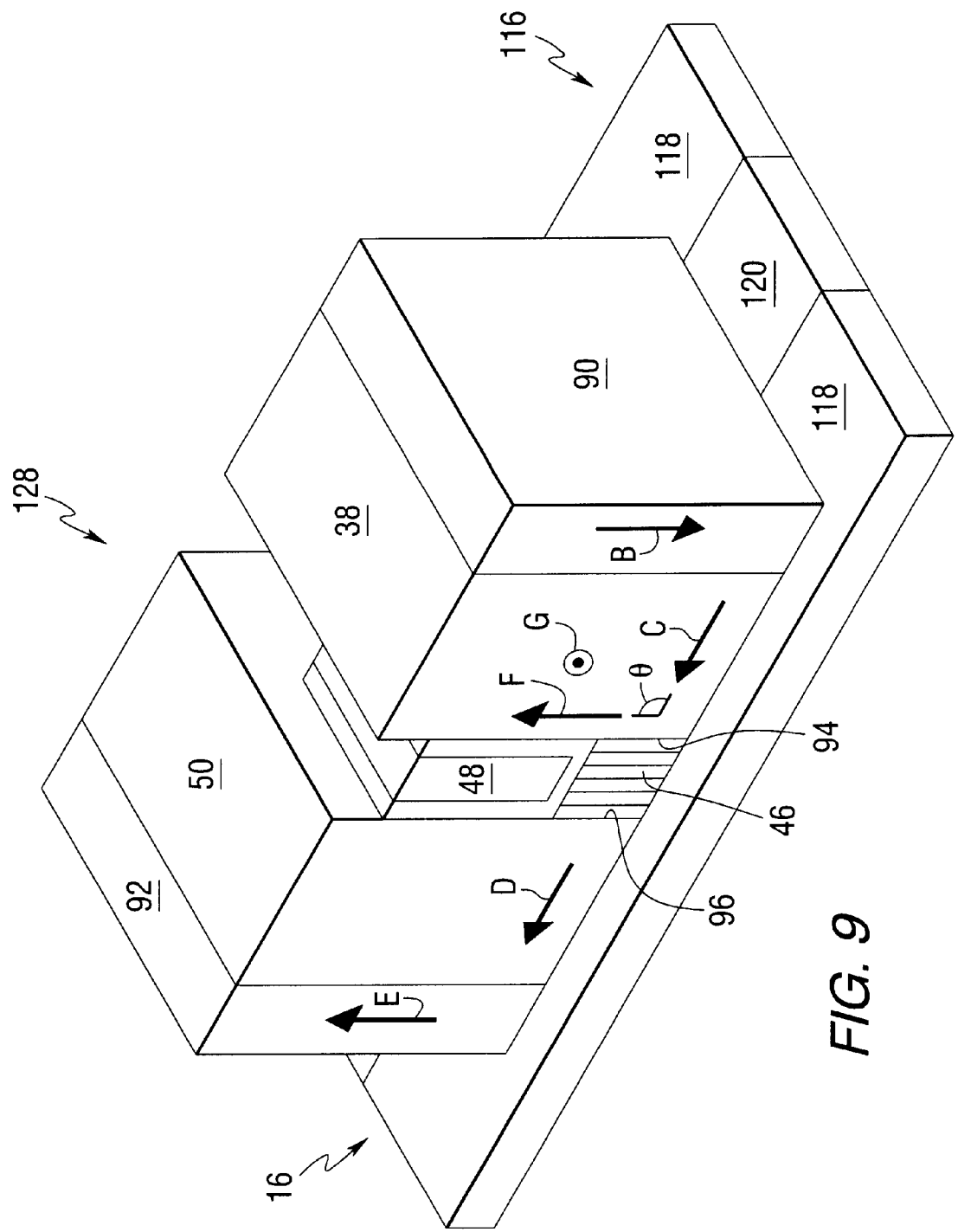
FIG. 9 is an isometric view of an alternative embodiment of a read element with the associated leads and shields according to the present invention.

Another preferred embodiment of this structure 128 is illustrated in FIG. 9. Although the example of FIG. 9 is for perpendicular recording, the same principle may be applied to longitudinal recording once it is understood. This embodiment of the recording head 22 includes a pair of electrical leads 90, 92, located outside of the magnetic shields 38, 50. The leads 90, 92 have a lower electrical resistance than the shields 38, 50. Therefore, the sense current will flow for the maximum distance possible through the electrical leads 90, 92, and through the minimum distance possible through the shields 38, 50, as indicated by the arrows B, C, D, and E. Because current flow C and D through the shields 38, 50 will be the minimum distance possible, this current flow will be perpendicular to the surfaces 94, 96 of the read element 46. In the example embodiments of FIG. 9, the default magnetization G of the shields 38, 50 is set perpendicular to both the direction of travel of the current C, and the anticipated magnetic field read from the recording media 16 by the read element 46 The magnetic field read from the recording media 16 will be oriented either up or down, and the magnetization within the shields 38, 50 will correspond to the magnetic field read from the domain of the recording media 16 which that shield 38, 50 is directly above. This magnetization will be oriented either upward as indicated by the arrow F, or downward, antiparallel to the arrow F. The angle θ between the sense current C, D and the magnetization F, G of the shields 38, 50 is therefore always 90°. Resistivity (ρ) is a function of the angle θ according to the equation $ρ=Δρ \sin^2θ+ρ_0$, where $ρ_0$ is the initial resistivity of the shield 38, 50, and Δ is the change in resistivity due to the changing magnetization. Therefore, ρ remains constant because θ always equals 90°, and the sine of θ equals the sine of 90° equals 1.

Figure 10:
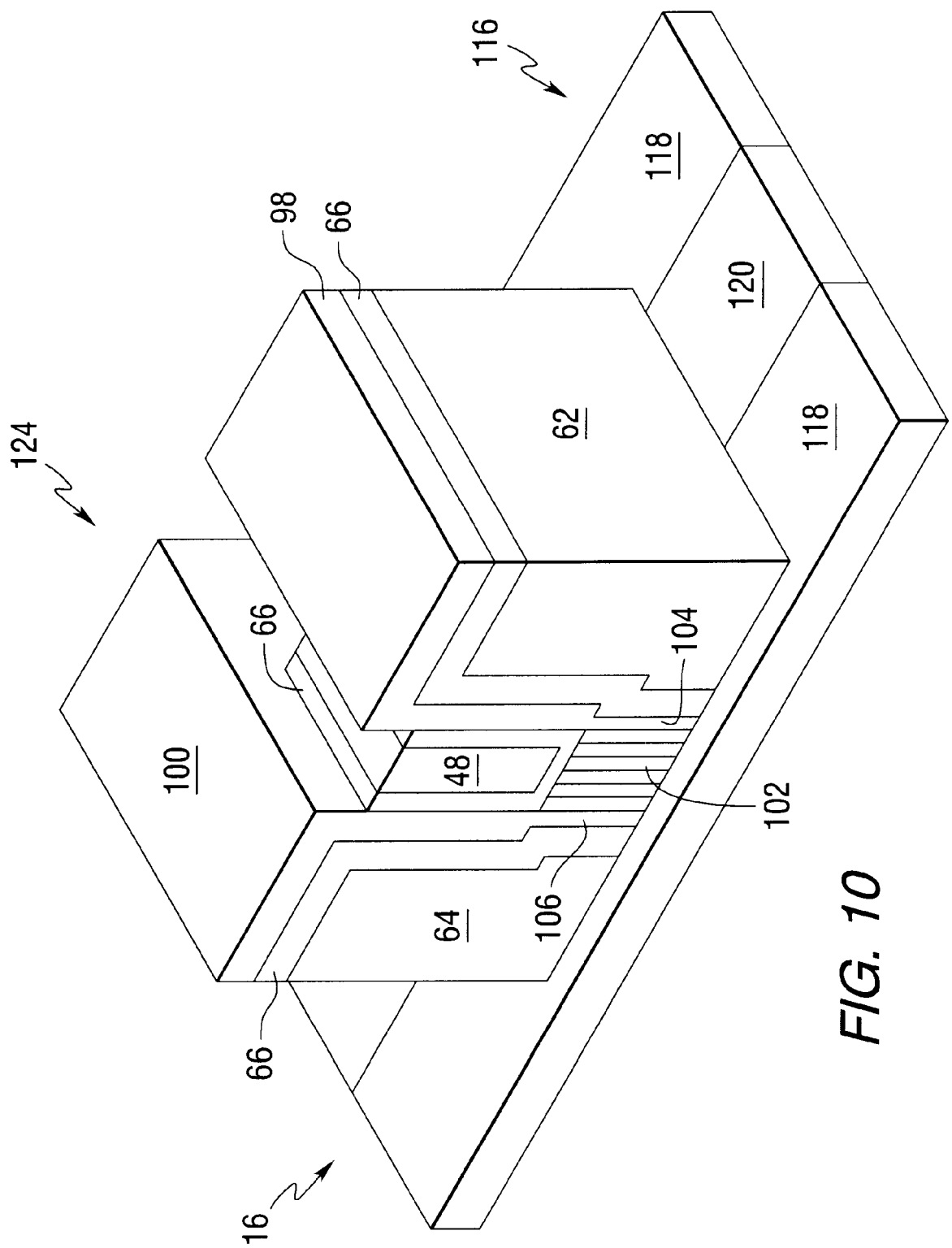
FIG. 10 is an isometric view of another alternative embodiment of a read element and associated leads and shields according to the present invention.
Figure 11:
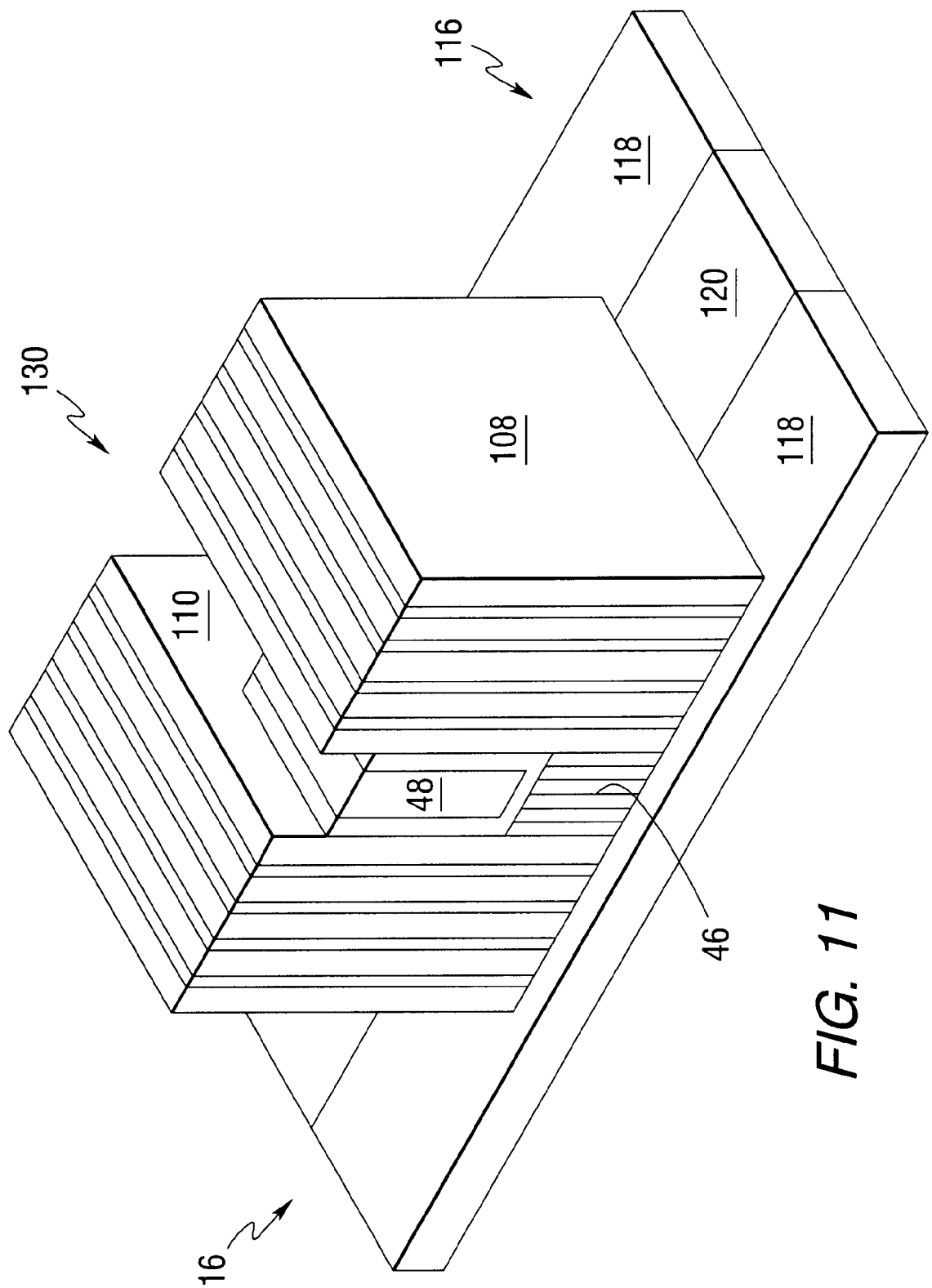
FIG. 11 is an isometric view of yet another embodiment of a read element and associated leads/shields according to the present invention.

Referring to FIG. 10, another embodiment of the invention is illustrated. This embodiment of the read structure 124 includes separate magnetic shields 62, 64, and electrical leads 98, 100. Insulation 66 separates the electrical leads 98, 100 from the magnetic shields 62, 64. The read structure 124 overcomes the disadvantages of the prior art by including a thin portion 104, 106 of the leads 98, 100, adjacent to the read element 102. Most of the leads 98, 100, thereby remain thick, providing low electrical resistance. However, the thin lead portions 104, 106 adjacent to the read head 102 reduces the distance between the magnetic shields 62, 64. Because the leads 98, 100 include thin sections 104, 106 adjacent to the read element 102, the distance between the shields 62, 64 adjacent to the recording medium 16 is minimized. The insulator 66 may or may not separate the shields 62, 64 from the thin portion of the leads 104, 106. Yet another preferred embodiment of the read structure 130 is illustrated in FIG. 11. The embodiment of FIG. 11 is similar to the embodiment of FIG. 6 in that a pair of shields 108, 110 also serve as electrical leads for supplying a sense current to the read element 46. However, the shields/leads 108, 110, instead of being made from an alloy structure, are made from a laminated structure having alternating layers of a first magnetic shielding material and a second electroconductive material. The layers of magnetic shielding material 112 will generally be selected from Ni, Fe, Co, and combinations thereof. Likewise, the second electroconductive layers 114 will be elements that will reduce the AMR effect, for example, Cu, Cr, Ti, Au, Ag, V, Zr, Ta, and W. The AMR reducing layers 114 will generally be kept relatively thin, so that the shields/leads 108, 110 may form effective magnetic shields.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A read structure for a recording head for use with magnetic recording media, said read structure comprising:

a read element; and a pair of shields on opposing sides of said read element, said shields being dimensioned and configured to magnetically shield said read element and to supply a sense current to said read element, each of said pair of shields formed by adding an anisotropic magneto-resistance effect reducing material with a magnetic shielding material.

2. The read structure according to claim 1, wherein said shields have a minimized anisotropic magneto-resistance effect.

3. The read structure according to claim 1, wherein said magnetic shielding material has ferromagnetic properties, and said anisotropic magneto-resistance effect reducing material has electroconductive properties.

4. The read structure according to claim 1, wherein said anisotropic magneto-resistance effect reducing material is dispersed within a crystal structure of said magnetic shielding material.

5. The read structure according to claim 1, wherein said magnetic shielding material comprises Ni, Fe, Co, or a combination thereof.

6. The read structure according to claim 1, wherein said anisotropic magneto-resistance effect reducing material comprises Cu, Cr, Mn, Ti, Au, Ag, V, Zr, Nb, Ta, W, or a combination thereof.

7. The read structure according to claim 1, wherein said read element is a current perpendicular to the plane type read element.

8. A recording head for use with magnetic recording media, said recording head comprising:

a read structure, comprising:

a read element;

a pair of shields on opposing sides of said read element, said shields being positioned adjacent said read element to supply a sense current to said read element, wherein said pair of shields have a minimized anisotropic magneto-resistance effect; and a pair of electrical leads on opposing sides of said pair of shields, said pair of electrical leads being positioned adjacent said pair of shields to supply a sense current across said pair of shields.

9. The recording head according to claim 8, wherein said shields comprise a first material component having ferromagnetic properties, and a second material component having electroconductive properties.

10. The recording head according to claim 9, wherein said second material is dispersed within a crystal structure of said first material.

11. The recording head according to claim 9, wherein said first material and said second material form a laminated structure.

12. The recording head according to claim 9, wherein said first material comprises Ni, Fe, Co, or a combination thereof.

13. The recording head according to claim 9, wherein said second material comprises Cu, Cr, Mn, Ti, Au, Ag, V, Zr, Nb, Ta, W, or a combination thereof.

14. The recording head according to claim 8, wherein said read element is a current perpendicular to the plane type read element.

* * * * *

UNITED STATES PATENT AND TRADEMARK OFFICE
CERTIFICATE OF CORRECTION

PATENT NO. : 6,807,032 B1 Page 1 of 1
APPLICATION NO. : 09/776435
DATED : October 19, 2004
INVENTOR(S) : Michael Allen Seigler et al.

It is certified that error appears in the above-identified patent and that said Letters Patent is hereby corrected as shown below:

Column 8, Line 67
"...and $\Delta$" should read --...and $\Delta\rho$--

Signed and Sealed this

Twenty-sixth Day of December, 2006

JON W. DUDAS
*Director of the United States Patent and Trademark Office*